United States Patent
Koenck et al.

(10) Patent No.: US 8,908,054 B1
(45) Date of Patent: Dec. 9, 2014

(54) OPTICS APPARATUS FOR HANDS-FREE FOCUS

(75) Inventors: Steven E. Koenck, Cedar Rapids, IA (US); David W. Jensen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 7 days.

(21) Appl. No.: 13/096,578

(22) Filed: Apr. 28, 2011

(51) Int. Cl.
*H04N 5/225* (2006.01)

(52) U.S. Cl.
USPC ........................................ 348/218.1; 348/222.1

(58) Field of Classification Search
None
See application file for complete search history.

(56) References Cited

U.S. PATENT DOCUMENTS

| | | | | |
|---|---|---|---|---|
| 7,084,904 | B2 * | 8/2006 | Liu et al. | 348/218.1 |
| 8,022,986 | B2 * | 9/2011 | Jekel | 348/139 |
| 8,035,680 | B2 * | 10/2011 | Mader et al. | 348/36 |
| 8,059,185 | B2 * | 11/2011 | Nose | 348/335 |
| 2003/0133008 | A1 * | 7/2003 | Stephenson | 348/47 |
| 2004/0227703 | A1 * | 11/2004 | Lamvik et al. | 345/76 |
| 2005/0185047 | A1 * | 8/2005 | Hii | 348/36 |
| 2008/0170140 | A1 * | 7/2008 | Silver et al. | 348/265 |
| 2009/0322891 | A1 * | 12/2009 | Kondo et al. | 348/218.1 |
| 2010/0097444 | A1 * | 4/2010 | Lablans | 348/46 |
| 2010/0118146 | A1 * | 5/2010 | Schofield et al. | 348/148 |
| 2010/0265331 | A1 * | 10/2010 | Tanaka | 348/159 |
| 2011/0043669 | A1 * | 2/2011 | Ishida | 348/264 |
| 2011/0134249 | A1 * | 6/2011 | Wood et al. | 348/164 |
| 2012/0002046 | A1 * | 1/2012 | Rapoport et al. | 348/143 |
| 2012/0013757 | A1 * | 1/2012 | Beckers et al. | 348/222.1 |

* cited by examiner

*Primary Examiner* — Twyler Haskins
*Assistant Examiner* — Wesley J Chiu
(74) *Attorney, Agent, or Firm* — Angel N. Gerdzhikov; Donna P. Suchy; Daniel M. Barbieri

(57) ABSTRACT

The present invention is directed to an electronic vision system. The system implements at least 3 apertures. A first aperture is set at near focus, while second and third apertures (positioned to the left and right of the first aperture respectively) are set at far focus. The fields of view of the left and right apertures may be spaced apart relative to each other, thereby forming a blind spot in the overall field of view of the system. However, the field of vision of the center aperture overlaps the blind spot, thereby reducing the blind spot for the system. The system includes a computer configured for receiving electronic image data from the apertures and rendering display data derived from the received image data. The system includes a display mounted to a mounting structure (ex.—helmet) for receiving the display data and displaying visual images of the display data.

15 Claims, 9 Drawing Sheets

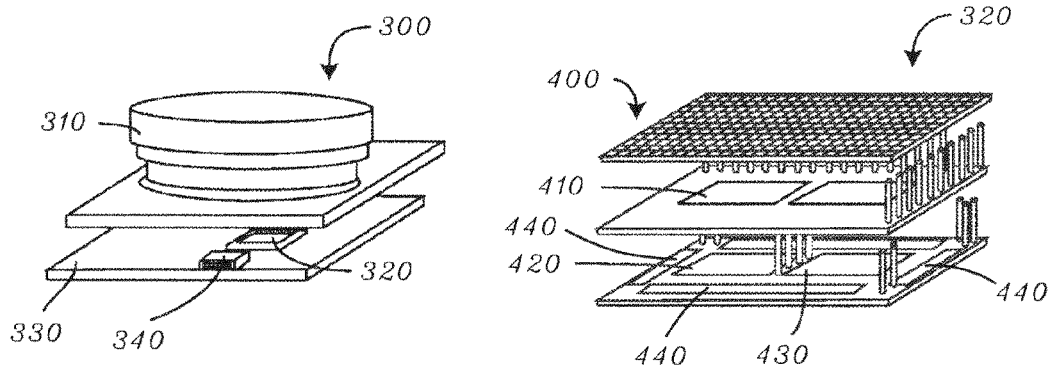
*FIG. 3*     *FIG. 4*
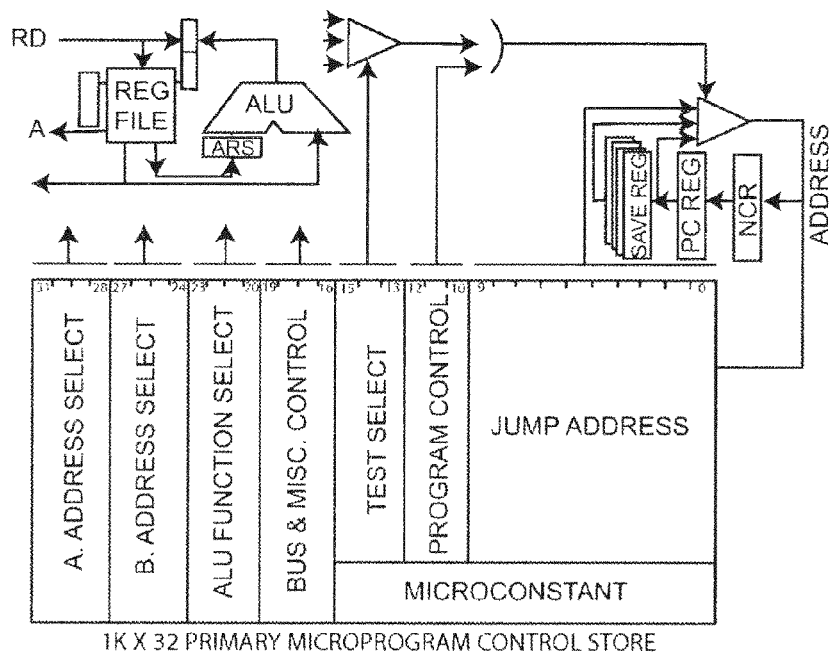
*FIG. 5*

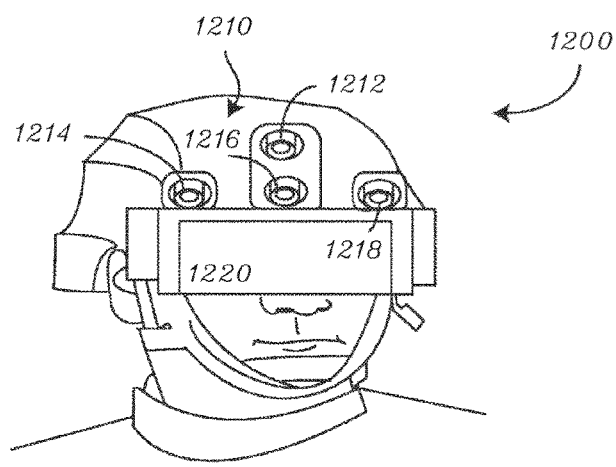
FIG. 8
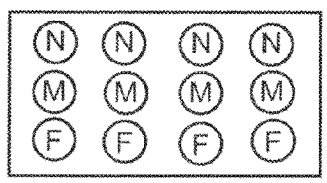    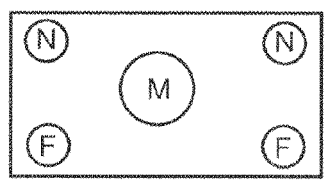    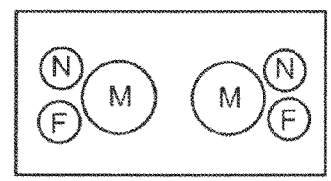
FIG. 9          FIG. 10         FIG. 11

OPTICS APPARATUS FOR HANDS-FREE FOCUS

CROSS-REFERENCE TO RELATED APPLICATIONS

U.S. patent application Ser. No. 12/572,492 entitled: Multiple Aperture Video Image Enhancement System filed Oct. 2, 2009 (pending); and U.S. patent application Ser. No. 12/572,600 entitled: Multiprocessor Discrete Wavelet Transform filed Oct. 2, 2009 (pending) are hereby incorporated by reference in their entireties herein.

FIELD OF THE INVENTION

The present invention relates to image sensing and more specifically to systems and methods for utilizing multiple imaging sensors for digitally capturing a scene and combining images in an efficient manner to produce a superior image quality.

BACKGROUND OF THE INVENTION

Current multi-lens (ex.—multi-camera) digital-imaging devices may experience difficulty with image alignment. Further, a number of such devices may also suffer from significant optical loss and reduced effective low light sensitivity.

Thus, it would be desirable to provide an optics apparatus which obviates problems associated with current solutions.

SUMMARY OF THE INVENTION

Accordingly, an embodiment of the present invention is directed to an electronic imaging system, including: a mounting structure; and a plurality of apertures, the plurality of apertures being connected to said mounting structure, where each aperture of said plurality of apertures includes: an electronic light sensor, a processor, and an interconnecting network segment configured for communicating with at least one of said plurality of apertures, the plurality of apertures including first, second and third apertures, the first aperture having a first field of view and being focused at a first focus point, the first focus point being located away from the system and within the first field of view, the second aperture having a second field of view and being focused at a second focus point, the second focus point being located within the second field of view and being further away from the system than the first focus point, the third aperture having a third field of view and being focused at a third focus point, the third focus point being located within the third field of view and being further away from the system than the first focus point, the plurality of apertures configured for generating electronic image data, the electronic image data including an image generated by the first aperture, an image generated by the second aperture, and an image generated by the third aperture, the first aperture-generated image, the second aperture-generated image and the third aperture-generated image depicting a scene, a first region of the scene being in focus in the first aperture-generated image and being out-of-focus in the second aperture-generated image and the third aperture-generated image, a second region of the scene being out-of-focus in the first aperture-generated image and being in focus in the second aperture-generated image and the third aperture generated image, the system configured for electronically processing the electronic image data to obtain an enhanced image, wherein both the first region and the second region are in focus in the enhanced image.

An additional embodiment of the present invention is directed to a method of generating and displaying images via an electronic vision system, said method including: generating electronic image data via a plurality of apertures of the electronic vision system, the plurality of apertures being connected to a mounting structure of the electronic vision system, the plurality of apertures including first, second and third apertures, the first aperture having a first field of view and being focused at a first focus point, the first focus point being located within the first field of view and being a first distance away from the system, the second aperture having a second field of view and being focused at a second focus point, the second focus point being located within the second field of view and being a second distance away from the system, the third aperture having a third field of view and being a third distance away from the system, the first distance being less than either the second distance or the third distance; providing electronic image data from the plurality of apertures of the electronic vision system to a computer of the electronic vision system; processing the electronic image data via the computer to render display data, said display data being derived from the electronic image data; providing the display data from the computer to a display device of the electronic vision system, the display device being disposed on the mounting structure; and displaying visual images of the display data via the display device, wherein the second field of view and the third field of view are distanced apart from each other by a blind area, wherein a first portion of the first field of view overlaps the second field of view, a second portion of the first field of view overlaps the third field of view, while a third portion of the first field of view is non-overlapping relative to the second field of view and the third field of view, the third portion of the first field of view encompassing at least a portion of the blind area.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 3 shows a partially exploded and simplified system of the present invention.

FIG. 4 shows a partially exploded view of a portion of a system of the present invention.

FIG. 5 shows a schematic representation of a computing portion of the system of the present invention.

FIG. 8 shows portions of the present invention mounted on a helmet.

FIG. 9 shows a configuration of 3×4 array of apertures.

FIG. 10 shows a two-column array of apertures with an extra central aperture.

FIG. 11 shows an array of apertures with two sets of three apertures.

DETAILED DESCRIPTION OF THE INVENTION

Figure 1:
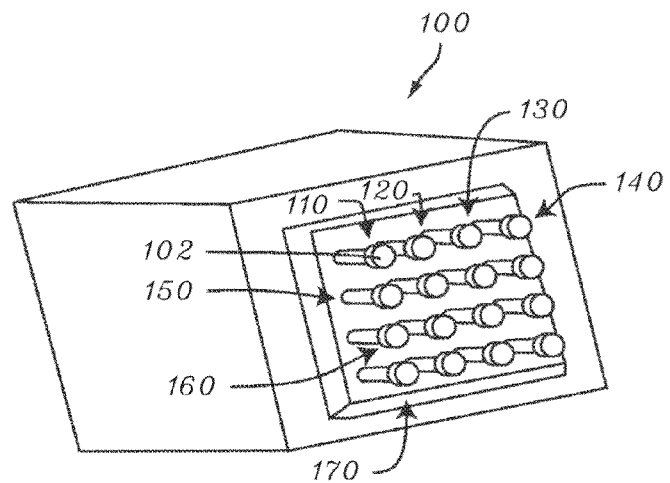
FIG. 1 shows a digital video imaging system of the present invention.

Reference will now be made in detail to the presently preferred embodiments of the invention, examples of which are illustrated in the accompanying drawings.

In the past, images have been captured most often by a single image capture mechanism to produce a single image or a series of single images (video). Also, multiple cameras have been used to capture a wider field of view. For example, multiple cameras have been placed in a pod with the cameras being pointed radially outward and the resultant images, typically nature and landscape images focused on infinity, are fused to create a panoramic video. It has also been known to use multiple spaced apart sensors or cameras with the same sensing capabilities and a specialized display mechanism to provide for 3D imaging.

It has also been known in the past to use image fusion to merge digital images taken from multiple sensor types into one combined image. For example, aviation, military, police, security, and search and rescue operations have been known for years to utilize multi-spectral image fusion where an infrared sensor and/or other low light sensors are used in combination with other sensors to present a merged and enhanced image which displays all of the captured images.

Cameras and video cameras, even if used in groups, have certain well-known limitations. For example, in a typical camera, one must select a focus setting; i.e., a distance from the camera lens where the photographer wants the images to be in the best focus. Images farther than the focus setting will become increasingly blurry with additional distance. Objects closer than the optimal focus setting distance also become increasingly blurrier as the distance decreases. An individual's own eye can adjust to focus farther or nearer. However, a movie theater customer cannot do the same; they are stuck with the focus setting and optimal focus length selected by the camera operator during the making of the movie.

Another limitation of cameras is dynamic range, which is the ability to capture details nearby while in a shadow and still capture clouds in a bright sky in the background. Post-processing software exists, such as Photoshop Lightroom by Adobe Systems Incorporated, for merging together multiple shots carefully taken in series from a stable tripod and with different settings for light exposure levels. The multiple shots are merged in a way that captures the best image quality in each area.

Another limitation of cameras, and especially video cameras, is the image file storage sizes, and for live broadcasting, the computing processing resources needed to process high quality, high resolution (i.e., high definition video for live broadcasts).

The present invention overcomes some long-standing problems associated with optical images, especially when images are being processed at video rates, with high resolution, in environments with varied lighting, and of scenes having objects of interest both near and far. The present invention further overcomes issues related to image alignment. Further, the present invention promotes reduced optical loss. Still further, the present invention promotes improved effective low light sensitivity.

Now referring to the drawings, wherein like numerals refer to like matter throughout and more particularly, referring to FIG. 1, there is shown a multiple aperture sensor system (also referred to hereafter as MASS) of the present invention, generally designated 100 which includes a 4×4 array of apertures including apertures 110, 120, 130, 140, 150, 160 and 170. The term "aperture" as used in the description of the present invention is not intended to mean merely a hole through which light passes, as the term is often used with respect to photography. The term "aperture" is used herein in a manner that is consistent with the use of aperture in the context of distributed aperture systems in the military. Each aperture includes: an optical assembly 102 which could be a lens, a filter, other optical attenuator, or a combination of the same; at least one sensor; and a processor. System 100 is a single assembly which includes a plurality of such apertures. Not shown are I/O interface connections which could be located anywhere, including the surfaces which are not visible in FIG. 1.

Digital cameras typically use a single optical assembly, a single sensor, and a single processor to implement an aperture as defined herein to capture and process images. The present invention is a system using multiple apertures to provide an improved image capturing system.

The present invention has many benefits from replacing a single aperture sensor system 200 with a MASS 100. One of the most obvious benefits is the reduction in size. Now referring to FIG. 2, there are shown two systems with similar optical and imaging capabilities. For example, the smaller lens assemblies of 100 reduce the weight and size. Smaller lenses are inherently lower cost than larger lenses and have fewer optical anomalies. Additionally, since the lenses of the present invention may be designed to provide a narrower field-of-view, they may be able to provide improved light gathering capacity using a reduced number of individual refractive elements.

The present invention replaces one large sensor with multiple smaller and preferably, closely-spaced sensors. This has the benefit of reducing the cost of the sensor; however, it does introduce a requirement of computing to merge the multiple small sensor images into a single larger image. It is possible to produce larger composite images from multiple sensors with the same or lower net sensor system cost. Also, multiple different types of sensors can be used in a system to provide additional benefits. As an example, using both low-light and normal light sensors could provide a user with a day-night imaging system. Low light and infrared sensors could be used together to provide enhanced situation awareness in challenging environments such as might be encountered in military and public safety applications. Cameras today provide significant computing processors to manipulate the large sensor data. A possible embodiment of the present invention may use multiple small microprocessors. Using many smaller processors provides scalability and power efficiency not attainable from a single large processor solution.

One embodiment of the multiple aperture sensor system of the present invention can provide superior images in a smaller, lower cost system. This approach enables new capabilities not possible with a single aperture system. The following discussion provides some specifics on the implementation of the hardware, software and system of this multiple aperture sensor system. Throughout this description, the term "aperture" is used to embody not only the hole through which light enters a camera or imaging system, but also to include the lens, sensor and mechanical housing.

Each aperture, generally designated 300, of the multiple aperture sensor system, uses three main hardware elements: sensors, processors and optics. FIG. 3 provides an illustration of those three elements. A single imaging optical element (102 FIG. 1) i.e. attenuator and/or lens is represented by the cylinder 310 on the top. A sensor 320 is shown as a black rectangle, disposed on a substrate 330. The processor is below the sensor. The rectangle 340 represents the electrical connector for the system.

Now referring to FIG. 4, there are shown details for a dense connection scheme to package the sensor 320 and computing in close proximity. The diagram shows a small array 400 of pixels from a portion of the sensor 320 on the top. In an exemplary embodiment, the system shows a pixel layer of 128×64 pixels each of which is 15 micrometers in width. These pixels are packed close together and may come in many different individual pixel sizes and array sizes and configurations. The pixels may be individually addressable and controlled or may be controlled as a group. Sensor devices 320 typically use analog to digital (A/D) converters 410 coupled through a multiplexer (Mux) to provide the captured image data to a processor in usable form. In FIG. 4, the pixels are shown as being connected vertically down to those converters 410, although other connection geometries are possible. The digital data is then routed down to a small processor (Micro-Core) 420 and stored in local memory 430. Also shown are interconnecting communication paths 440 oriented in the North, West, South, and East directions. In an exemplary embodiment, those communication paths 440 or similar paths would connect to the connectors 340 in FIG. 3. The vertical stacking of optics, sensors, and computing allows for a very compact and mobile product, such as helmet mounted sensors and small handheld devices.

In FIG. 5, possible core building blocks of the processor for the present invention are shown. It is believed that a person possessing ordinary skill in the art, aided by this application, would be able to make and use the computing portion of the present invention. One of the advantages of the multiple aperture sensor system 100 is the capability to support and process different types of sensors. This disclosure focuses on sensors for light (visible, low-light, and infrared). Many types of sensors exist to measure the intensity of the electromagnetic spectrum. The concepts taught by this disclosure are intended to apply to other spectrums and sensors as well, such as: acoustic, sonar, radio waves, X-ray, and gamma rays.

Commercial light detecting sensors may be implemented using a variety of materials. Common is the Charge Coupled Device (CCD), which implements an analog shift register that moves analog signals (electric charges) through successive capacitors under the control of a clock signal. These devices are typically created on silicon wafers and chips like many digital devices today. Also common is Complementary Metal Oxide Semiconductor (CMOS) sensor chips, which perform similar functions. Both of these devices use arrays of small transistor devices to capture and convert light (photons) to an analog voltage. The voltages are measured and converted to digital images. Military and security forces use sensors for low-light (nighttime) operations. Such an image sensor is the Cypress LUPA-300 device (PN CYILI SM0300AA).

The multiple aperture sensor system will use multiple sensors. Configurations that use multiple sets of a single type of sensor and/or that mix different types of sensors may be implemented. Further, configurations that use different settings of similar or identical sensors may also be implemented. Sensor costs typically increase with size and with novel materials. Mixing small low-cost sensors with expensive large sensors can provide a more cost-effective solution for some systems. It is also recognized that combining the output of expensive infrared sensors with low-cost conventional image sensors can produce a lower cost system with enhanced imagery. These concepts and configurations are discussed below. With algorithm enhancement and correction routines, the MASS system 100 may produce better images than a single aperture system. Scalable low power computing is important to produce an embedded MASS system 100. It is believed that it may be beneficial to use multiple microcoded processors to provide the desired performance of some of the future multifunction embedded products.

Digital cameras typically use a single aperture to capture light and images one at a time. There are many software algorithms to process those images. Some software algorithms exist to stitch multiple overlapping images into a single panoramic image. Some prior art software algorithms exist to combine images with different exposure times into a single high dynamic range image. It is believed that these image processing algorithms, which traditionally process single images or process multiple images taken over time, can benefit from processing images taken simultaneously with the multiple aperture sensor system 100. An example benefit is the concurrent capture of multiple images, which enables real-time video enhancement. Another example is capturing lower light images by combining results from multiple sensors. Of course, one must address well-known issues, such as different resolution and registration when combining results from different sensors. However, these issues are easier with multiple tightly spaced apertures than with multiple images captured at different times.

A broad set of algorithms may be desirable to support the multiple aperture sensor system 100. Such algorithms typically combine multiple images to produce a higher resolution image than the original images. Combining images captured simultaneously avoids issues such as motion blurring.

The super resolution concept of the present invention enables the use of multiple lower resolution, less expensive sensors to replace a single high resolution expensive sensor. Additionally, the present invention could include a multi-aperture sensor system 100 where the central apertures in an array are relatively high resolution and those around the periphery are lower resolution. This would mimic the fovea characteristic of the human eye where the area around the central area of focus has high resolution and the peripheral vision areas are much lower because the eye will not perceive the detail even if displayed. This may conserve computing resources, power and battery consumption, heat generation, etc. For example, in FIG. 1, the four central apertures under apertures 120 and 130 and in the same rows as aperture 150 and 160 would be high resolution and all others would be lower resolution. This may be most beneficial in applications such as shown in FIG. 8 below where the video data captured by the sensors is dependent upon the direction the helmet is pointed (especially if eye tracking is also used) and it is displayed to one person in real time. In such examples, there is no need to provide high resolution data in the peripheral vision of the viewer, since it will not be perceived by the viewer.

Similarly, multiple focus distance displays and photographs can be generated by utilizing sensors within one aperture that have substantially different predetermined optimal lens to image focus distances. Likewise, dynamic range enhancement can be achieved with the use of sensors within an aperture that have substantially different light exposure sensitivity.

It is within ordinary skill in the art (after reading the disclosure of the present invention) to process many of the aforementioned algorithms. To more efficiently support these algorithms, we describe a framework where we transform images to a frequency domain. In an exemplary embodiment, a Le Gall 3/5 Discrete Wavelet Transform (DWT) may be used. This performs a reversible transformation to a low frequency and high frequency mapping. The low frequency map can be used to improve the performance of searching algorithms such as registration and feature recognition. The high frequency map can be used to improve the performance of algorithms that reduce noise and enhance detail in images. It is only necessary to perform the transformation once when using a DWT framework for multiple algorithms. Following the enhancement algorithms applied to the frequency domain data, a single transformation converts the data back to a normal image. The Le Gall 3/5 DWT is used in the JPEG 2000 compression algorithm. Another method which could be utilized is described in the above cross-referenced application entitled: Multiprocessor Discrete Wavelet Transform.

The Discrete Wavelet Transform (DWT) can be represented with both spatial and frequency representations. The DWT provides for multiple passes of encoding and is completely reversible. The transform processes entire rows and columns into low frequency and high frequency components. The low frequency data retains the essential image information and is shown in the upper left corner of the processed images. The high frequency coefficients are stored in the other three quadrants and represent areas of rapid change between adjacent pixels. Each pass of the DWT is recursively applied to the low frequency portion of the data of the previous pass. A DWT framework may provide a representation of the image that enables efficient processing of many image algorithms.

As noted above, the low frequency representation enables faster searching and feature identification. The high frequency representation enables efficient noise reduction and feature enhancement. Additional examples based on this framework are discussed below. One example illustrates a technique for hand-free or continuous focus using multiple images captured at different focus depths, which is a key aspect of the invention. The apertures of the multiple aperture sensor system 100, could be divided so that some are focused at a close range, while others are focused at a mid range and others at a long range. The best focused segments of the objects visible in of each of these images are then combined into a single view that renders essentially every object visible in the image in focus. Also key to the present invention is a technique for combining multiple images captured at different exposure times to provide a high resolution image. The DWT framework is also applicable to dynamic range compression, where, for example, a high bit-depth image is displayed on a relatively lower bit depth display.

Figure 2:
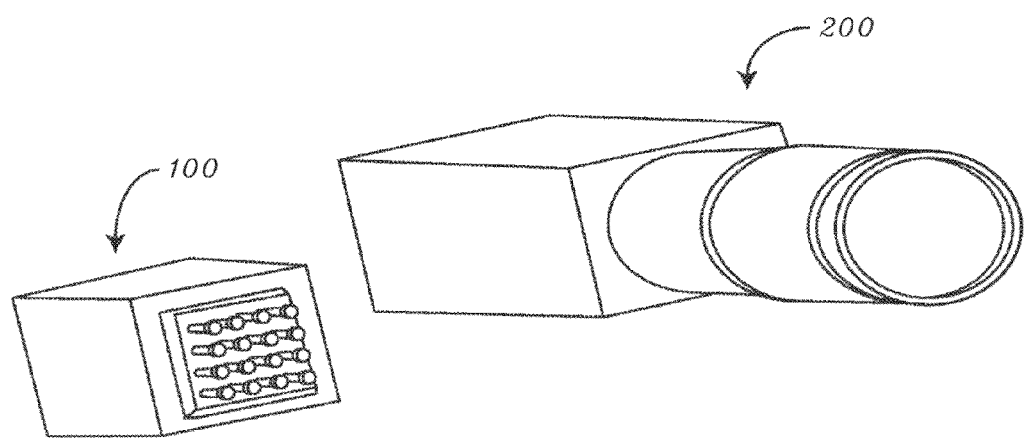
FIG. 2 shows a system of the present invention alongside a typical known prior art photographic or video imaging system.
Figure 6:
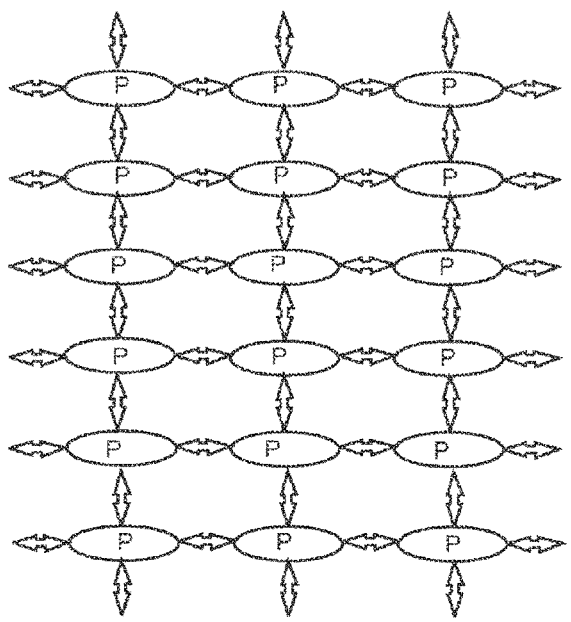
FIG. 6 shows a graphical representation of nodes in a communication network of the present invention.

FIG. 2 describes a multiple aperture sensor system 100 enabled through a networked set of apertures, said apertures including processing, sensor, and optic elements. In an exemplary embodiment, FIG. 3 shows an aperture with its three main hardware components (sensors, processing, and optics). FIG. 6 shows how such nodes may be connected to form a simple mesh network. Each aperture (labeled P) communicates with its nearest four neighbors using a north, west, east, and south communication paths.

Figure 7:
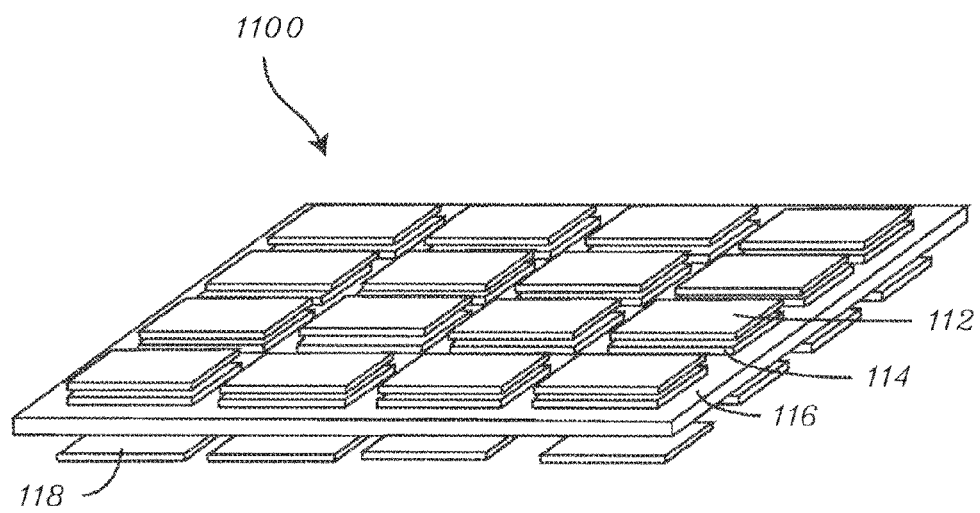
FIG. 7 shows a circuit board, optical, and computing assembly of the present invention.

FIG. 7 is an illustration of a multiple aperture sensor array board, generally designated 1100, of approximated 41 mm×41 mm size containing a 4×4 grid of nodes. The inter-die gaps are shown at approximately 3 mm with 8 mm×8 mm die size. Each node has an image sensor 112 on the top and a computing device (FPGA) 114 underneath. Each node has an external memory module (RAM) 118 on the back side of the printed circuit board 116. Note: it generally is preferred to minimize the inter-die gap as much as possible. In many of the applications of the present invention, much benefit is received by having the apertures as closely spaced as practically possible. The multiple aperture sensor array board 1100 with individual small lenses (not shown) positioned above the sensor devices 112 enables a compact embodiment of the MASS.

The Multiple Aperture Sensor System 100 provides size, weight, and power benefits for image sensing and processing products. It is expected that there will be an assortment of variants of the system 100 for use on vehicles compared to battery powered mobile systems. Different variants will be used for other sensor systems to support non-visible applications, such as acoustic, sonar and radar. Sensor types and computing will drive the power requirements. The design of the MASS aperture can include a single set or multiple sets of optics assemblies, sensors and computers. In FIG. 3, a node with a single optics assembly, a sensor, and a computing device is shown. Variants with multiple optics assemblies, prisms, mirrors, sensors, and computing devices may also be implemented.

FIG. 8 illustrates an application of the MASS concept for an Advanced Combat Helmet. This MASS includes four apertures. As an example, the two center apertures could be infrared and low light sensors. The two edge apertures are high resolution visible light sensors. The computing combines the four aperture images to provide the soldier with a wide panoramic day/night view of his environment. The Multiple Aperture Sensor System configuration shown in FIG. 8 for the Advanced Combat Helmet is just one of many potential configurations. Each configuration produces different results when evaluated for system weight, size, cost, power, field-of-view, and resolution. There are many parameters to consider in the design of a MASS helmet. These parameters include the number and positions of apertures, the resolution per aperture, the algorithms, and the sensor types. FIGS. 9-11 illustrate three example configurations for such MASS systems. In those figures, each of the aperture nodes is labeled Near (N), Medium (M), or Far (F) for different focus depths. These labels could alternatively represent different exposure sensitivities. The size of the node could indicate the resolution of the sensor or different sensor types such as ultraviolet, infrared, or other electro-optical devices.

It is expected that various different MASS configurations could be conceived. It is possible to consider many configurations with 3, 4 and 5 apertures positioned over various field of views. The number of rows of apertures can be varied. As noted above, different resolutions, exposure times, and sensor types increase the number of potential configurations. Further, an extra aperture in the rear of the helmet could provide the soldier with additional situation awareness not available in current systems.

Figure 12:
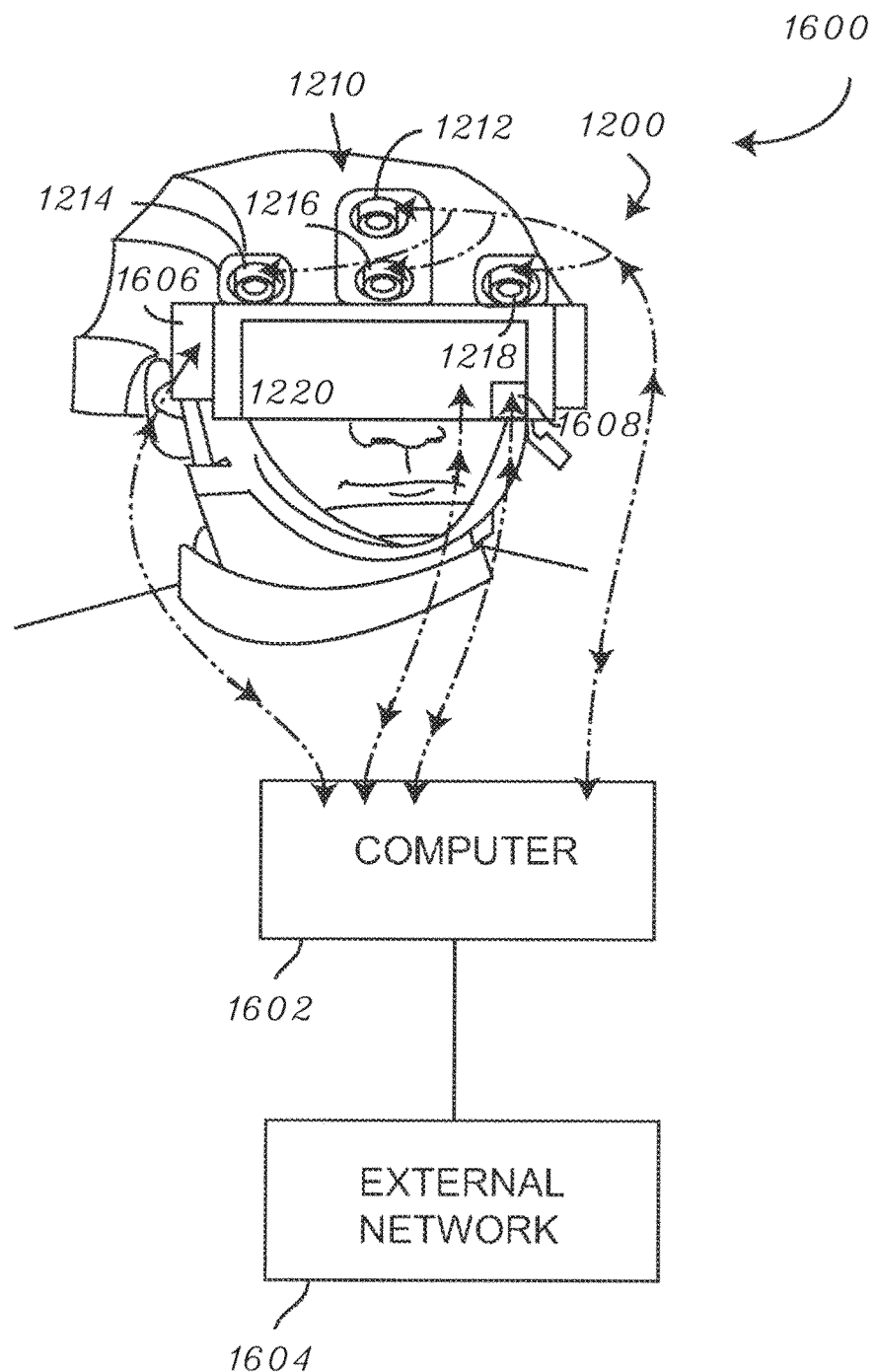
FIG. 12 shows a helmet mounted vision system of the present invention.

Now referring to FIG. 12, there is shown a helmet-mounted vision system of the present invention generally designated 1600, including a helmet system 1200 of FIG. 8, which includes an array 1210 of apertures 1212, 1214, 1216 and 1218 which are coupled to each other and to a computer 1602 which is coupled to an external network 1604. Also shown is helmet tracking system 1606 and eye tracking system 1608, both of which are well known in the art. Also shown is a display device 1220 which is configured to display the image data which has been captured by the array 1210 of apertures and rendered by the computer 1602 or by one of the processors in one of the apertures.

Soldiers conducting operations in urban terrain need to be able to see both near and far without having to physically (ex.—manually) adjust their vision equipment. Previous approaches have involved motorized lenses, which functioned much like autofocus cameras. Unfortunately, the precision and time-to-focus performance of such motorized lenses did not provide a suitable level of performance in such environments (ex.—were not sufficient for soldier vision). As described above, optical systems configured for providing hands-free focus and configured for use in the dismounted soldier environment have been provided. One or more of these systems may implement multiple apertures, with each aperture scanning (ex.—looking at) the same field-of-view (FOV), and with each aperture set to a different focus point. For example, if the system implements only two apertures, one aperture may be focused at a distant point, and the other aperture may be focused at a near point. Images captured by the two apertures may render all objects in acceptable focus somewhere in one aperture or the other. A spatial frequency analysis, such as a discrete wavelet transform (DWT) may be performed on each image, as discussed above. Portions of the image having the largest DWT coefficients corresponding to the highest spatial frequency (and therefore the sharpest focus) are then selected. The most difficult challenge when implementing such DWT focus fusion systems and methods is the physical alignment of the images. When implementing systems with two lenses, it is not possible for both lenses to have exactly the same optical axis or boresight. An optical beam splitter may be configured to provide a common boresight, but may result in significant optical loss and reduced effective low light sensitivity.

A solution for solving the above-referenced shared optical boresight problem is discussed below.

Figure 13:
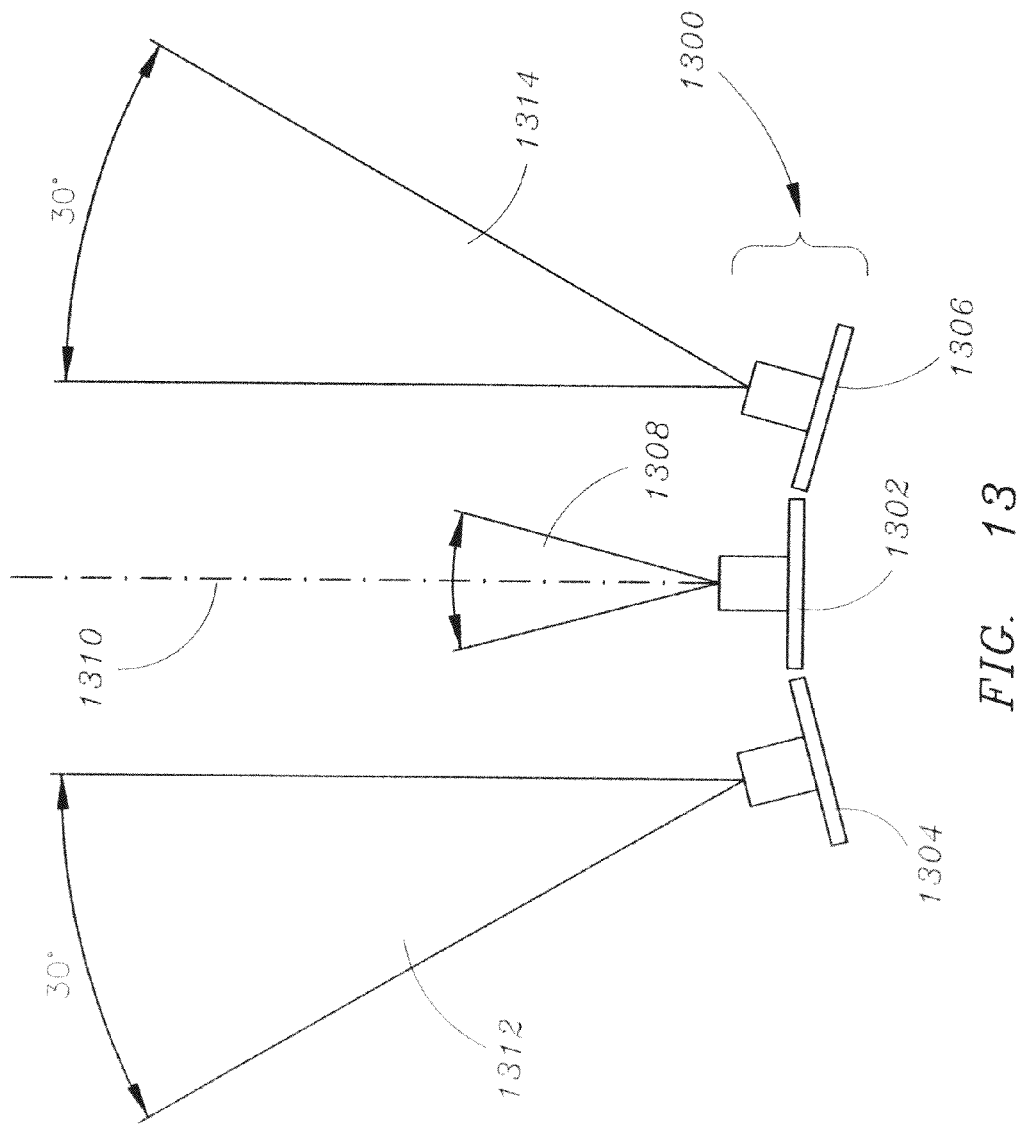
FIG. 13 shows a digital video imaging system (ex.—a Multiple Aperture Sensor System (MASS)) in accordance with a further embodiment of the present invention.
Figure 14:
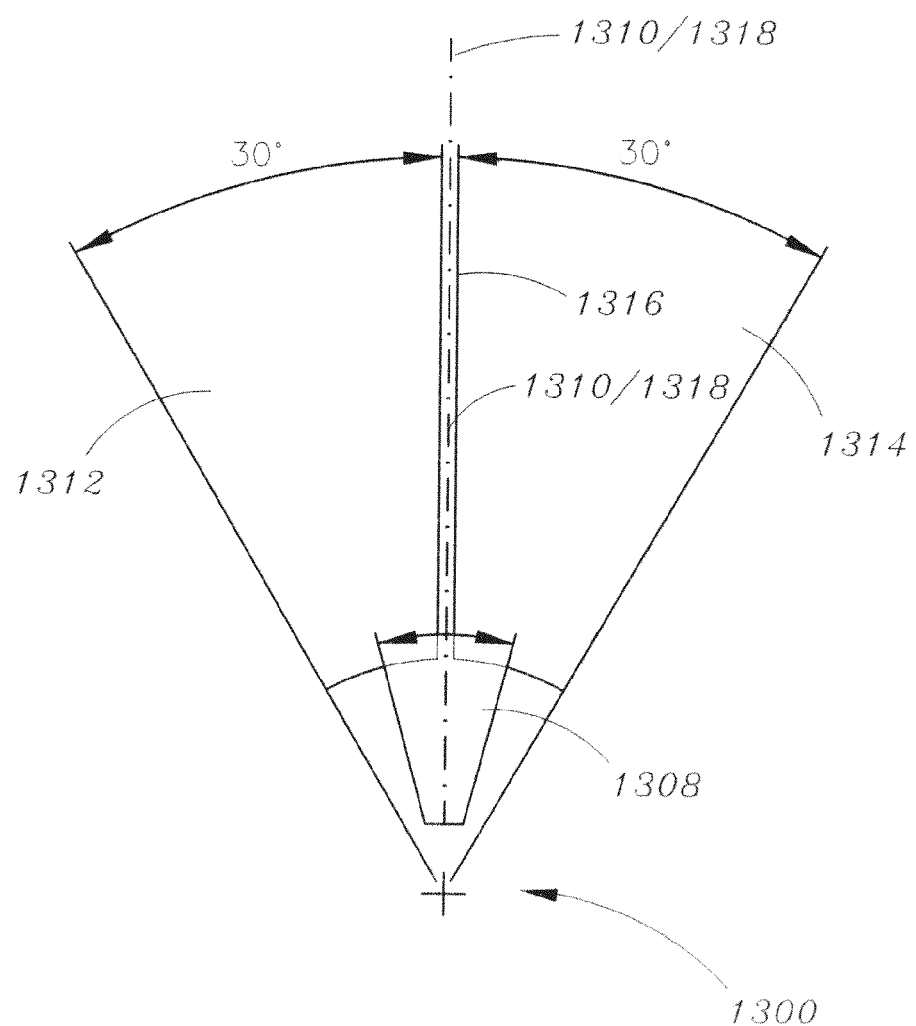
FIG. 14 illustrates fields of view of the apertures of the MASS shown in FIG. 13.

Referring to FIGS. 13 and 14, block diagrams of a Multiple Aperture Sensor System (MASS) 1300 in accordance with a further embodiment of the present invention are shown. The MASS 1300 may include optics assemblies, sensors and computing devices as the MASS embodiments described above and may be constructed and/or configured in a manner similar to one or more of the MASS embodiments described above (ex.—to include component(s) of any one or more of the MASS embodiments described above). In the embodiment illustrated in FIGS. 13 and 14, the MASS 1300 may include three apertures 1302, 1304 and 1306. The first aperture 1302 may be set to and/or established at a first focus setting (ex.—close focus). In an exemplary embodiment, the first aperture 1302 may have a field of view (FOV) 1308. For instance, the first aperture 1302 may be configured such that its field of view 1308 is thirty degrees (ex.—the first aperture 1302 may utilize a thirty-degree field of view (FOV) lens). Further, the first aperture 1302 may have a physical boresight 1310.

In further embodiments, the second aperture 1304 and the third aperture 1306 may be positioned or located adjacent to (ex.—may be positioned to the left and right of) the first aperture 1302. In exemplary embodiments, the second aperture and the third aperture may each be set to, established at and/or focused at a second focus setting (ex.—distant focus), the second focus setting being a different focus setting than the first focus setting. In exemplary embodiments, the second aperture 1304 may have a field of view 1312. For instance, the second aperture 1304 may be configured such that its field of view 1312 is thirty degrees (ex.—the second aperture 1304 may utilize a thirty-degree field of view lens). In further embodiments, the third aperture 1306 may have a field of view 1314. For instance, the third aperture 1306 may be configured such that its field of view 1314 is thirty degrees (ex.—the third aperture 1306 may utilize a thirty-degree field of view lens).

As mentioned above, the apertures 1302, 1304 and 1306 may be tightly spaced relative to each other, thereby resulting in the second aperture 1304 and third aperture 1306 being physically separated by a relatively small distance. In exemplary embodiments of the present invention, the physical spacing between the second aperture 1304 and the third aperture 1306 may translate into spacing 1316 between the second aperture field of view 1312 and the third aperture field of view 1314 (as shown in FIG. 14). The spacing 1316 between the second aperture field of view 1312 and the third aperture field of view 1314 becomes, results in and/or represents a narrow blind spot or blind strip 1316 located between the field of view 1312 of the second aperture 1304 and the field of view 1314 of third aperture 1306.

In exemplary embodiments of the present invention, the physical boresight 1310 of the first aperture 1302 is aligned with, aligned on and/or aligned along (ex.—exactly aligned with) a centerline 1318 of the blind strip 1316, the centerline 1318 of the blind strip 1316 being a centerline 1318 between the second aperture 1304 and the third aperture 1306. Further, the centerline 1318 of the blind strip 1316 may be or may serve as a virtual boresight 1318, which (neglecting the blind strip 1316), would essentially be the same as if a single, sixty-degree, full field-of-view aperture were boresighted on that line 1318.

As mentioned above, because the first aperture 1302 is aligned with the centerline 1318 of the blind strip 1316, the field of view 1308 of the first aperture 1302 may at least partially overlap the blind strip 1316 (as shown in FIG. 14), thereby at least partially filling the blind strip 1316 in close focus and thus, promoting reduction of and/or minimization of the blind strip 1316. For the MASS 1300 of the present invention, the width of the blind strip 1316 may be made quite small since the MASS 1300 may implement small sensors and lenses that may be very tightly spaced. For example, a blind strip 1316 measuring one inch or less in width may be attained.

In exemplary embodiments, the apertures (1302, 1304, 1306) of the MASS 1300 are each configured for capturing images. Like other MASS systems described above, the MASS 1300 may have computing components which are configured for evaluating (ex.—inspecting) image data (ex.—images) captured by the apertures (1302, 1304, 1306) and rendering display data including a final image based upon the captured images. Multiple methods, such as those described above, may be implemented by the MASS 1300 for rendering said final image which is to be displayed by a display.

In further embodiments of the present invention, the field of view of one or more of the apertures (1302, 1304, 1306) of the MASS may be varied. For example, the second aperture 1304 may be configured to have a field of view of thirty-one degrees, while the third aperture 1306 is configured to have a field of view of thirty degrees, which may cause the field of view of the second aperture 1304 to overlap with the field of view of the third aperture 1306. This may be problematic in that both the second aperture 1304 and the third aperture 1306 may end up capturing images of the same object, and it is desirable to have the particular object appear only once in the displayed image. The computing and algorithms of the MASS 1300 may be configured for examining images captured by all apertures (1302, 1304, 1306) of the MASS, determining when two (or more) of the apertures are capturing images of a same object, and determining how to best render the image to be displayed.

Figure 15:
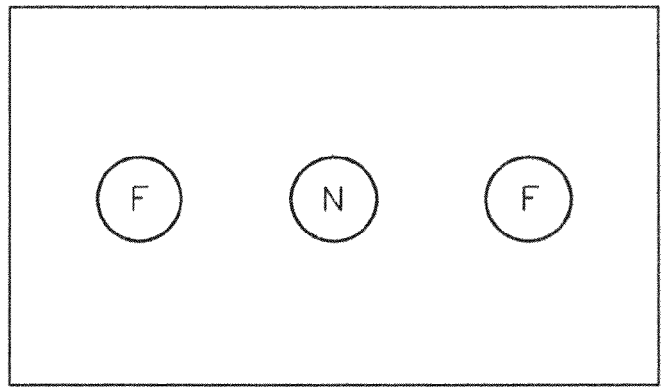
FIG. 15 shows a MASS aperture configuration of a 2×1 array of apertures in accordance with an exemplary embodiment of the present invention.
Figure 16:
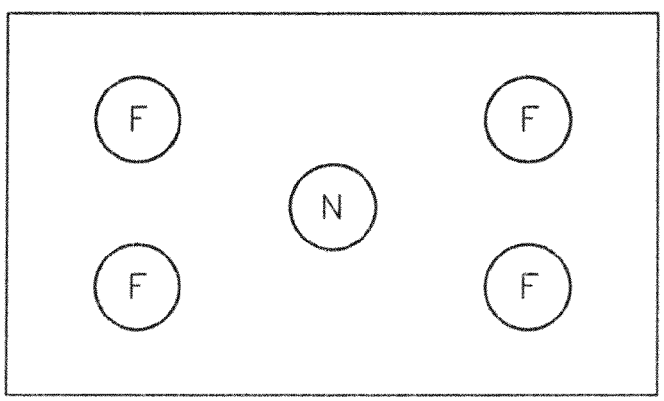
FIG. 16 shows a MASS aperture configuration of a 2×2 array of apertures in accordance with an exemplary embodiment of the present invention.

In exemplary embodiments of the present invention, the MASS 1300 may be implemented with, may be adapted for use in and/or may be included as part of an Advanced Combat Helmet, such as the Advanced Combat Helmet shown in FIG. 8. FIG. 15 illustrates the exemplary aperture configuration for the MASS 1300 when implemented in the Advanced Combat Helmet. As shown in FIG. 15, the first aperture 1302 is labeled Near (N) to represent its focus depth and/or focus setting, while the second aperture 1304 and the third aperture 1306 are each labeled Far (F) to represent their focus depth(s) and/or focus setting(s). In alternative embodiments, rather than having two distant focus apertures, and one near focus aperture (such as MASS 1300 described above), a MASS 1400 in accordance with a further embodiment may include four distant focus apertures, and one near focus aperture, as shown in FIG. 16 and may be implemented with an Advanced Combat Helmet.

In further embodiments, MASS 1300 or MASS 1400 may be implemented with, may be adapted for use in and/or may be included as part of a helmet-mounted vision system, such as the helmet-mounted vision system shown in FIG. 12. In still further embodiments, the MASS embodiments described herein may be implemented as part of an electronic vision system (exs.—a digital night vision system, solid-state helmet vision system, night vision goggle system, etc.)

Figure 17:
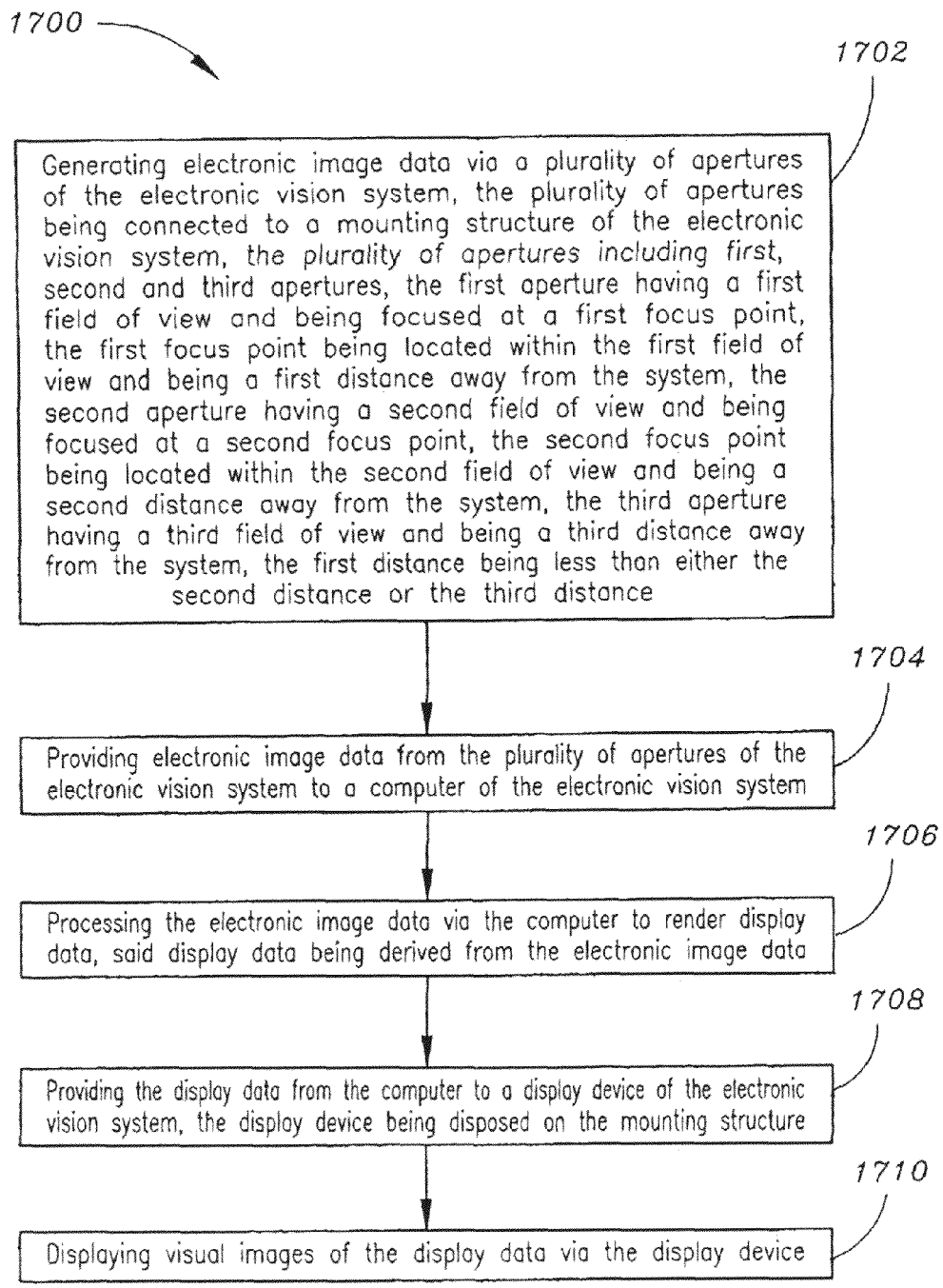
FIG. 17 is a flowchart illustrating a method for generating and displaying an image via the MASS shown in FIG. 13 in accordance with an exemplary embodiment of the present invention.

FIG. 17 depicts a flowchart illustrating a method for generating and displaying images via an electronic vision system in accordance with an exemplary embodiment of the present invention. In exemplary embodiments, the method 1700 includes the step of generating electronic image data via a plurality of apertures of the electronic vision system, the plurality of apertures being connected to a mounting structure of the electronic vision system, the plurality of apertures including first, second and third apertures, the first aperture having a first field of view and being focused at a first focus point, the first focus point being located within the first field of view and being a first distance away from the system, the second aperture having a second field of view and being focused at a second focus point, the second focus point being located within the second field of view and being a second distance away from the system, the third aperture having a third field of view and being a third distance away from the system, the first distance being less than either the second distance or the third distance 1702. The method 1700 may further include the step of providing electronic image data from the plurality of apertures of the electronic vision system to a computer of the electronic vision system 1704. The method 1700 may further include the step of processing the electronic image data via the computer to render display data, said display data being derived from the electronic image data 1706. The method 1700 may further include the step of providing the display data from the computer to a display device of the electronic vision system, the display device being disposed on the mounting structure 1708. The method 1700 may further include the step of displaying visual images of the display data via the display device 1710. As mentioned above, the second aperture 1304 and third aperture 1306 may be established at a same focus setting (ex.—distant focus), while the first aperture 1302 may be established at a different focus setting (ex.—near focus) from the second and third apertures (1304, 1306). Further, in an embodiment, the second aperture 1304 and the third aperture 1306 may each have a thirty degree field of view. Further, the second field of view 1312 and the third field of view 1314 may be distanced apart from each other by a blind area 1316. Still further, a first portion of the first field of view 1308 overlaps the second field of view 1312, a second portion of the first field of view overlaps the third field of view 1314, while a third portion of the first field of view is non-overlapping relative to the second field of view and the third field of view, the third portion of the first field of view encompassing at least a portion of the blind area 1316.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium/computer-readable storage medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An electronic imaging system, comprising:
a mounting structure;
a plurality of apertures, the plurality of apertures being connected to said mounting structure, where each aperture of said plurality of apertures includes: an electronic light sensor, a processor, and an interconnecting network segment configured for communicating with at least one of said plurality of apertures, the plurality of apertures including at least a first aperture, a second aperture, and a third aperture, the first aperture having a first field of view and being focused at a close focus range, the close focus range being located away from the system and within the first field of view, the second aperture having a second field of view and being focused at a mid focus range, the mid focus range being located within the second field of view and being further away from the system than the close focus range, the third aperture having a third field of view and being focused at a long focus range, the third field of view and the second field of view distanced apart from each other by a blind area, the long focus range being located within the third field of view and being further away from the system than the close focus range, a physical boresight of the first aperture aligned along a centerline of the blind area;

each of the first, second and third apertures being focused at its respective focus range;

the plurality of apertures configured for simultaneously generating electronic image data, the electronic image data including an image generated by the first aperture, an image generated by the second aperture, and an image generated by the third aperture, the first aperture-generated image, the second aperture-generated image and the third aperture-generated image depicting a scene, a near region of the scene being in focus in the first aperture-generated image and being out-of-focus in the second aperture-generated image and the third aperture-generated image, a far region of the scene being out-of-focus in the first aperture-generated image and being in focus in the second aperture-generated image and the third aperture generated image;

a computer being coupled to said plurality of apertures, the computer for receiving the electronic image data from each of the plurality of apertures, the computer performs a spatial frequency analysis of the electronic image data and sends, to a display device, the processed image data for the near region and the far region from one of the first aperture, the second aperture, and the third aperture having a high spatial frequency; and the display device being disposed on said mounting structure and communicatively coupled with said computer for receiving the processed image data having the high spatial frequency, the display device further having a visual display for rendering the scene, wherein both the near region and the far region are in focus in the rendered scene.

2. An electronic imaging system as claimed in claim 1, wherein the mid focus range and the long focus range are equal.

3. An electronic imaging system as claimed in claim 1, wherein the second aperture and the third aperture each have a same angular magnitude of field of view.

4. An electronic imaging system as claimed in claim 1, wherein a first portion of the first field of view overlaps the second field of view, a second portion of the first field of view overlaps the third field of view, while a third portion of the first field of view is non-overlapping relative to the second field of view and the third field of view, the third portion of the first field of view encompassing at least a portion of the blind area.

5. An electronic imaging system as claimed in claim 1, wherein the mounting structure is configured for being worn by a person, and the rendered scene is viewable by the person wearing the mounting structure.

6. An electronic imaging system as claimed in claim 5, wherein the mounting structure is a helmet.

7. An electronic imaging system as claimed in claim 1, wherein said first aperture is aligned with a physical boresight of said mounting structure and the second and third apertures are aligned fifteen degrees from said physical boresight of said mounting structure.

8. An electronic imaging system as claimed in claim 1, wherein said computer is one of said processors of one of said apertures.

9. An electronic imaging system as claimed in claim 1, further comprising:
a circuit board, the circuit board configured for being connected to the mounting structure, wherein said plurality of apertures are disposed in an array upon the circuit board.

10. An electronic imaging system as claimed in claim 1, wherein said computer is coupled to an external network.

11. An electronic imaging system as claimed in claim 1, wherein said computer is configured for rendering display data which includes a foveated image, a central region of said foveated image having a higher resolution than a peripheral region of said foveated image, the plurality of apertures including a fovea aperture which is disposed centrally in said plurality of apertures and a peripheral aperture which is disposed in a non-central location in said plurality of apertures, the fovea aperture outputting an image signal having a higher resolution characteristic than an image signal output by the peripheral aperture.

12. A method of generating and displaying images via an electronic vision system, said method comprising:
generating electronic image data via a plurality of apertures of the electronic vision system, the plurality of apertures being connected to a mounting structure of the electronic vision system, the plurality of apertures including at least a first aperture, a second aperture, and a third aperture, the first aperture having a first field of view and being focused at a close focus range, the close focus range being located within the first field of view and being a first distance away from the system, the second aperture having a second field of view and being focused at a mid focus range, the mid focus range being located within the second field of view and being a second distance away from the system, the third aperture having a third field of view and being focused at a long focus range, the long focus range a third distance away from the system, the first distance being less than either the second distance or the third distance, the second field of view and the third field of view distanced apart from each other by a blind area, a physical boresight of the first aperture aligned along a centerline of the blind area;
providing electronic image data from the plurality of apertures of the electronic vision system to a computer of the electronic vision system;
analyzing the provided electronic image data via a spatial frequency analysis;
selecting electronic image data from one of the first aperture, the second aperture, and the third aperture based on the spatial frequency analysis;
transmitting the selected electronic image data to the computer;
processing the electronic image data via the computer to render display data, said display data being derived from the electronic image data;
providing the display data from the computer to a display device of the electronic vision system, the display device being disposed on the mounting structure; and
displaying visual images of the display data via the display device.

13. A method of generating and displaying images as claimed in claim 12, wherein the mid focus range and the long focus range are equal.

14. A method of generating and displaying images as claimed in claim 12, wherein the second aperture and the third aperture each have a thirty degree field of view.

15. A method of generating and displaying images as claimed in claim 12, wherein a first portion of the first field of view overlaps the second field of view, a second portion of the first field of view overlaps the third field of view, while a third portion of the first field of view is non-overlapping relative to the second field of view and the third field of view, the third portion of the first field of view encompassing at least a portion of the blind area.

* * * * *